United States Patent [19]

Tamaru et al.

[11] Patent Number: 4,924,469

[45] Date of Patent: May 8, 1990

[54] SEMICONDUCTOR INTEGRATED CIRCUIT DEVICE

[75] Inventors: Kiichiro Tamaru, Tokyo; Koichi Tanaka, Kawasaki; Akira Kanuma; Yasuo Yamada, both of Yokohama, all of Japan

[73] Assignee: Kabushiki Kaisha Toshiba, Kawasaki, Japan

[21] Appl. No.: 152,824

[22] Filed: Feb. 5, 1988

[30] Foreign Application Priority Data

Feb. 6, 1987 [JP] Japan .................................. 62-25724

[51] Int. Cl.$^5$ ............................................. G06F 3/04
[52] U.S. Cl. ..................................... 371/22.4; 371/16.1
[58] Field of Search ............. 371/25, 15, 16, 19, 371/15.1, 16.1, 22.1, 22.3., 22.4, 22.5, 22.6, 25.1

[56] References Cited

U.S. PATENT DOCUMENTS

| 4,534,030 | 8/1985 | Paez | 371/25 |
| 4,601,033 | 7/1986 | Whelan | 371/25 |
| 4,780,874 | 10/1988 | Lenoski | 371/25 |
| 4,799,004 | 1/1989 | Mori | 371/25 |

OTHER PUBLICATIONS

Konemann et al., "Built-In Test for Complex Digital Integrated Circuits," IEEE Journal of Solid-State Circuits, vol. SC-15, No. 3, pp. 315-319, Jun. 1980.

Primary Examiner—Michael R. Fleming
Attorney, Agent, or Firm—Finnegan, Henderson, Farabow, Garrett and Dunner

[57] ABSTRACT

In a system including LSIs, the signature register used for self-testing the LSI functions is assigned to one register accessible by a machine instruction. The signature is calculated in the self-test operation, and the calculation result is updated depending on the result from the execution of the machine instruction. With the above technical idea, the test function for the LSI function is available not only for the test mode, but also for the normal operation. This simplifies the self-test program for testing the functions of the application system.

10 Claims, 6 Drawing Sheets

F I G. 1

F I G. 2

F I G. 3

F I G. 4A

F I G. 4B

F I G. 5

F I G. 6

F I G. 7

SEMICONDUCTOR INTEGRATED CIRCUIT DEVICE

BACKGROUND OF THE INVENTION

This invention relates to a semiconductor integrated circuit device with a self-test function.

A large scale integrated circuit (LSI) and a test circuit which operates independently of the LSI are formed on a semiconductor chip. The test circuit is used to test the function of the LSI according to the self-test program. A signature register is generally used as the self-test circuit.

An application system with LSIs is also provided with a self-test program. At the time of power on, the system functions and the LSIs functions are tested by the self-test programs.

The LSIs and the system are independently tested. Therefore, even if some of the LSI test functions are the same as those in the application system test functions, it is impossible to apply those of the LSI test functions for the application system function test. Therefore, the self-test program for the application system cannot be shortened, and much labor and time are needed to form the program.

SUMMARY OF THE INVENTION

Accordingly, an object of this invention is to provide a semiconductor integrated circuit device in which some of the self-test functions used for the LSI function can be used not only in the self-test mode but also in the normal mode, and thus can be used for the application system function test, to simplify the self-test program for the application system, reducing the labor and time taken for forming the self-test program for the application system.

To achieve the above object, according to the present invention, the signature register used for self-testing the LSI functions is assigned to one register accessible by a machine instruction. The signature is calculated in the self-test operation, and the calculation result is updated depending on the result from the execution of the machine instruction.

With the above technical idea, the test function for the LSI function is available not only for the test mode, but also for the normal operation. This simplifies the self-test program for testing the functions of the application system.

According to the present invention, there is provided a semiconductor integrated circuit device having a signature register operable in a test mode, in which a signature value is set in said signature register and referred to by a machine instruction.

According to the present invention, there is further provided a semiconductor integrated circuit device having a signature register operable in a test mode, said semiconductor integrated circuit device comprising: a general register; first and second operation input buses connected to the output terminal of said general register; an operation section coupled at the input terminals with said first and second operation input buses, for receiving the value as stored in said general register; and an operation result output bus coupled with the output terminal of said operation section and the input terminal of said general register, for supplying the result of operation from said operation section to said general register, and storing it in said general register, said semiconductor integrated circuit device in which the input terminal of said signature register is connected to said operation result output bus, the output terminal of said signature register is connected to said first and second input buses, said signature register calculates a signature of the operation result provided by said operation section when said operation result is loaded into said general register, and the signature value is set in said signature register and referred to by a machine instruction.

According to the present invention, there is still further provided a semiconductor integrated circuit device having a signature register operable in a test mode, said semiconductor integrated circuit device comprising: a general register; an operation input/output bus coupled with an input terminal and a first output terminal of said general register; an operation input bus connected to a second output terminal of said general register; an operation section coupled at first and second input terminals with said buses, for receiving the value as stored in said general register; and a latch circuit provided between the output terminal of said operation section and said operation result output bus, said latch circuit latching the output of said operation section when said operation input/output bus is receiving a signal from said general register, and supplying the operation result provided by said operation section when the inputting of said signal from said general register to said latch circuit ends, said semiconductor integrated circuit device in which the input terminal and said first output terminal of said signature register are connected to said operation input/output bus, said second output terminal of said signature register is connected to said operation input bus, said signature register calculates a signature of the operation result supplied from said latch circuit when said operation result is loaded into said general register, and the signature value is set in said signature register and referred to by a machine instruction.

According to the present invention, there is yet further provided a semiconductor integrated circuit device having a signature register operable in a test mode, said semiconductor integrated circuit device comprising: a general register; an operation input/output bus coupled with an input terminal and a first output terminal of said general register; an operation input bus connected to a second output terminal of said general register; a first latch circuit coupled at the input terminal with said operation input/output bus, said first latch circuit latching said signal from said general register when said operation input/output bus is receiving a signal from said general register, and said first latch circuit outputting the latched value when the inputting of said signal from said general register to said first latch circuit ends; a second latch circuit coupled at the input terminal with said operation input bus, said second latch circuit latching said signal from said general register when said operation input bus is receiving a signal from said general register, and said second latch circuit outputting the latched value when the inputting of said signal from said general register to said second latch circuit per se ends; and an operation section coupled at first and second input terminals with the output terminals of said first and second latch circuits, for receiving the outputs of said first and second latch circuits, said operation section outputting the operation result to said operation input/output bus, said semiconductor integrated circuit device in which the input terminal and said first output terminal of said signature resister are connected to said operation input/output bus, said second output terminal of said signature register is connected to said operation input bus, said signature register calculates a signature of the operation result supplied from said operation section when said operation result is loaded into said general register, and the signature value is set in said signature register and referred to by a machine instruction.

According to the present invention, there is further provided a semiconductor integrated circuit device having a signature register operable in a test mode, said semiconductor integrated circuit device comprising: a general register; an operation input/output bus coupled with an input terminal and an output terminal of said general register; an operation input bus connected to a second output terminal of said general register; a first latch circuit coupled at the input terminal with said operation input/output bus, said first latch circuit latching said first operand when said operation input/output bus is receiving a first operand from said general register; a second latch circuit coupled at the input terminal with said operation input bus, said second latch circuit latching said second operand when said operation input bus is receiving a second operand from said general register; an operation section coupled at first and second input terminals with the output terminals of said first and second latch circuits, for receiving the outputs of said first and second latch circuits, said operation section outputting the operation result to said operation input/output bus; and a third latch circuit coupled between the output terminal of said operation section and said operation input/output bus, said third latch circuit latching the output of said operation section when said operation input/output bus is receiving said operands from said general register, and said third latch circuit supplying the operation result provided by said operation section when the inputting of said operand ends, said semiconductor integrated circuit device in which the input terminal and said output terminal of said signature register are connected to said operation input/output bus, said signature register calculates a signature of the operation result supplied from said three latch circuits when said operation result is loaded into said general register, and the signature value is set in said signature register and referred to by a machine instruction.

DETAILED DESCRIPTION OF THE PREFERRED EMBODIMENT

Figure 1:
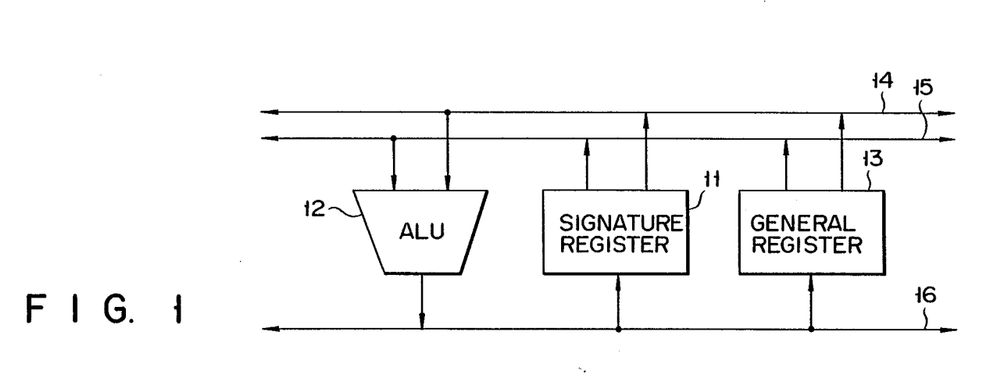
FIG. 1 shows a block diagram showing an arithmetic operation section of a microprocessor in a semiconductor integrated circuit according to an embodiment of the present invention.

An embodiment of this invention will first be described by referring to the accompanying drawings. FIG. 1 shows in block form an operation section of a three-bus system, which is used for a microprocessor in a semiconductor integrated circuit according to this invention. In the illustration, a signature register, an arithmetic logic unit, and a general register are picked up. In FIG. 1, reference numeral 11 designates a signature register, 12 an arithmetic logic unit, 13 a general register, 14 a first operation input bus, 15 a second operation input bus, and 16 an operation result output bus. As shown, general register 13 and signature register 11 are coupled in the same status between operation result output bus 16 for outputting the operation result of arithmetic logic unit 12, on one hand, and first and second operation input buses 14 and 15 for supplying input signals to arithmetic logic unit 12 on the other hand.

Figure 2:
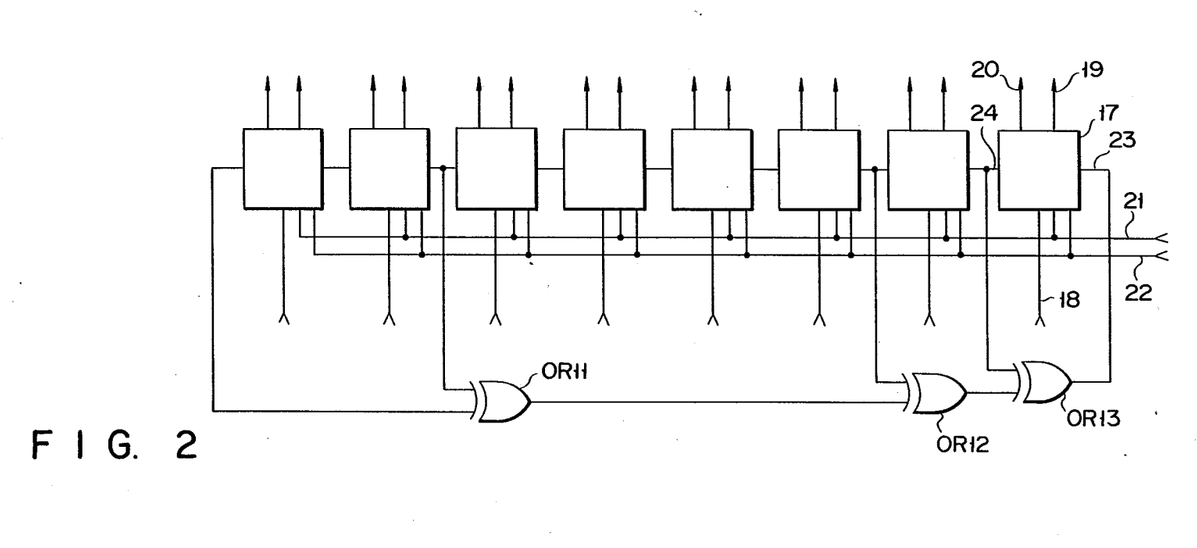
FIG. 2 shows a block and circuit diagram of a signature register in the circuit shown in FIG. 1.

FIG. 2 shows an arrangement of signature register 11. In this signature register, the buses 14 to 16 shown in FIG. 1 are each of the 8-bit type, and the polynomial expression in the signature calculation is $(X^8+X^6+X^2+X+1)$. In the register arrangement, the bit order becomes higher from right to left in the illustration. In FIG. 2, eight bit circuits 17 constitute a signature register. Reference numeral 18 represents an operation result input signal line, 19 a first operation input bus output signal line, 20 a second operation input bus output signal line, 21 a clock input signal line, 22 a signature value set control signal line, 23 a signature calculation input signal line, and 24 a signature calculation output signal line.

Eight bit circuits 17 are connected in a cascade fashion. The output terminal of the most significant bit circuit is connected to the input terminal of the least significant bit circuit, via three exclusive OR circuits OR11, OR12 and OR13. Specifically, the output terminal of the most significant bit circuit is connected to the first input terminal of exclusive OR circuit OR11. The second input terminal of exclusive OR circuit OR11 is connected to the output terminal of the bit circuit which is two levels lower in order than the most significant bit. The output terminal of exclusive OR circuit OR11 is connected to the first input terminal of exclusive OR circuit OR12. The second input terminal of exclusive OR circuit OR12, is connected to the output terminal of the bit circuit which is one level higher in order than the least significant bit. The output terminal of exclusive OR circuit OR12 is connected to the first input terminal of exclusive OR circuit OR13. The second input terminal of exclusive OR circuit OR13 is connected to the output terminal of the least significant bit circuit. The output terminal of exclusive OR circuit OR13 is connected to the input terminal of the least significant bit circuit. These bit circuits 17 are coupled for reception with the operation results via signal line 18, a clock signal via signal line 21, and a control signal for setting a signature value via signal line 22. These bit circuits output a first operation input bus output signal via signal line 19, and a second operation input bus output signal via signal line 20.

Figure 3:
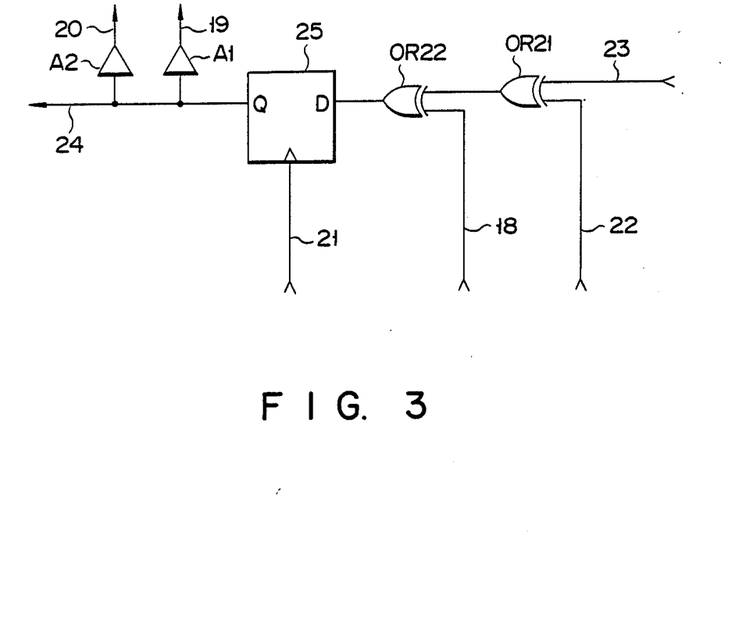
FIG. 3 shows a circuit diagram showing a detailed arrangement of a bit circuit in the circuit shown in FIG. 2.

FIG. 3 shows a detailed arrangement of each bit circuit in the signature register 17 in FIG. 2. In FIG. 3, like reference symbols are used for like or equivalent portions in FIG. 2. In the figure, reference numeral 25 designates a latch circuit for latching a signature value (signature latch circuit).

A signature calculation input signal is input to the D terminal of latch circuit 25 via two exclusive OR circuits OR21 and OR22. Exclusive OR circuit OR21 is coupled at the first input terminal with the signature calculation input signal via signal line 23, and at the second input terminal with a signature value set control signal via signal line 22. The output signal of exclusive OR circuit OR21 is input to the first input terminal of exclusive OR circuit OR22. The operation result input signal is input to the second input terminal of exclusive OR circuit OR22, by way of signal line 18. Latch circuit 25 is coupled for reception with a clock signal for its control, by way of signal line 21. The output signal of latch circuit 25 is input through signal line 24 to the bit circuit which is at one bit higher order. Additionally, the first and second input bus output signals are output through amplifiers A1 and A2.

Latch circuit 25, which is under control by the clock signal, latches a logical value or a signature value, which is determined by the operation result input signal, signature calculation input signal, and signature value set control signal. The latch circuit outputs the signature value through signal lines 24, 19 and 20. When signature value control signal line 22 is logical "0", the value latched in latch circuit 25 is an exclusive logical sum of the values to be applied to signal lines 18 and 23. When signal line 22 is logical "1", it is the NORed value of the value applied to signal line 18, irrespective of the value applied to signal line 23.

When the 8-bit circuit of FIG. 2 is constructed by using the FIG. 3 circuits, a signal representing the exclusive logical sum of the polyonomial, $(X^8+X^6+X^2+X+1)$, is applied to the least significant bit circuit, by way of signal line 23. In the remaining bit circuits, a first bit circuit applies its output through signal line 24 to a second bit circuit whose bit order is one bit lower than that of the first bit circuit, the second bit circuit applies its output through signal line 24 to a third bit circuit whose bit order is one bit lower than that of the second bit circuit, and so on.

When the signature value set control signal input in common to the respective bit circuits via signal line 22, is logical "0", the signature values of 8 bits for the logical values of the operation result input signals of 8 bits as input through signal lines 18 are calculated and held every time the clock signal input through signal line 18 is logical "1". In other words, every time the clock signal is logical "1", a signature value to be held is calculated by using the signature value now being held and the operation result input.

When the signature value set control signal is logical "1", the NORed value of the operation result input signal input through signal line 18 is set therein, irrespective of the signature value now being held. For this reason, a desired value can be set in signature register 11 by applying to signal line 18 the NORed value of the desired value to be set in signature register 11.

In this embodiment under discussion, the signature register 11 as shown in FIGS. 2 and 3 is assembled into the operation section of the microprocessor, as shown in FIG. 1. The microprocessor of the integrated circuit will operated when a machine instruction is executed.

Let us consider the execution of a machine instruction whose statement is "to add together the values stored in the two registers and to store the result into one of the registers". The values stored in the two registers (not shown) as selected by general register 13 are applied to first and second operation input buses 14 and 15, respectively. These values are applied to the two input terminals of arithmetic logic unit 12. The result of the operation (addition result) by arithmetic logic unit (ALU) 12 is output to operation result output bus 16. The operation result output to output bus 16 is loaded into register 13. At this point, the execution of the machine instruction completes. At the same time, the operation result or addition result from ALU 12 is loaded into signature register 11 connected in parallel with general register 13. Signature register 11 computes a signature of the addition result. Setting the operation result into signature register 11 and referring to the result are performed as in the case of general register 13. Let us consider an instruction stating "to set the value of general register 13 into signature register 11". To execute this instruction, the value of a selected register in general register 13 is first output to one of the first and second operation input buses, e.g., first operation input bus 14. Arithmetic logic unit 12 outputs the NORed value of first operation input bus 14 to operation result output bus 16. At this time, if the signature value set control signal on signal line 22 in FIG. 2 is logical "1", the NORed value of it is loaded into signature register 11. Then, the execution of this instruction ends.

As described above, in this embodiment, signature register 11 is operated like general register 13, so that the following operations are possible: to set a value to signature register 11 by the machine instruction, to refer to the signature value from the signature register, and to calculate a signature value for each clock by using the operation result at the execution of any other machine instruction than that to set the value to the signature register.

The simplification of the self-check program will be described. Table-1 shows a conventional self-test program using only the execution results of the machine instruction. Table-2 shows a self-test program using the signature register as discussed in the above-mentioned embodiment. These programs are applied to a case that operation of the ALU is conformed by the addition in which a carry propagates to all of the bits, and the subtraction in which a borrow propagates to all of the bits. Each of Table-1 and Table-2 tabulate for each program step machine instructions, normal operation results by the ALU when no fault occurs, and the operation result by the ALU when the "0 stuck fault" occurs. Table-3 shows the contents of the signature register in each program step for the operation results from the ALU when the ALU normally operates and when "0 stuck fault" occurs.

TABLE-1

| Step | Machine instruction | Normal output of signature register | Signature register output at "0" stuck fault |
|---|---|---|---|
| 1 | LD R0,#01 | 0000 0001 | 0000 0000 |
| 2 | LD R1,#FF | 1111 1111 | 1111 1110 |
| 3 | ADD R0,R1 | 0000 0000 | 1111 1110 |
| 4 | CMP R0,#00 | 0000 0000 | 1111 1110 |
| 5 | BNE ERROR | — | — |
| 6 | SUB R0,R1 | 0000 0001 | 0000 0000 |
| 7 | CMP R0,#01 | 0000 0000 | 0000 0000 |
| 8 | BNE ERROR | — | — |

TABLE-2

| Step | Machine instruction | Normal output of signature register | Signature register output at "0" stuck fault |
|---|---|---|---|
| 1 | LD SGR,#FF | 1111 1111 | 1111 1110 |
| 2 | LD R0,#01 | 0000 0001 | 0000 0000 |
| 3 | LD R1,#FF | 1111 1111 | 1111 1110 |
| 4 | ADD R0,R1 | 0000 0000 | 1111 1110 |
| 5 | SUB R0,R1 | 0000 0001 | 0000 0000 |
| 6 | CMP SGR,#F1 | 0000 0000 | 1111 1101 |

TABLE-2-continued

| Step | Machine instruction | Normal output of signature register | Signature register output at "0" stuck fault |
|------|---------------------|-------------------------------------|----------------------------------------------|
| 7    | BNE ERROR           | —                                   | —                                            |

TABLE-3

| Step | Normal output of signature register | Signature register output "0" stuck fault |
|------|--------------------------------------|-------------------------------------------|
| 1    | 0000 0000                            | 0000 0001                                 |
| 2    | 0000 0001                            | 0000 0011                                 |
| 3    | 1111 1100                            | 1111 1000                                 |
| 4    | 1111 1000                            | 0000 1110                                 |
| 5    | 1111 0001                            | 0000 1101                                 |
| 6    | 1110 0011                            | 0000 0110                                 |
| 7    | —                                    | —                                         |

The operation of the microprocessor in the IC under control by the conventional self-check program in Table-1 will be described.

| Step 1: | To set "01" (hexadecimal) into register R0. |
|---------|----------------------------------------------|
| Step 2: | To set "FF" (hexadecimal) into register R1. |
| Step 3: | To add together the contents of registers R0 and R1, and load the result of addition to register R0. |
| Step 4: | To compare the contents of register R0 with "00" (hexadecimal). |
| Step 5: | To jump to the "ERROR" address if step 4 provides noncoincidence between them. |
| Step 6: | To subtract the contents of register R1 from those of register R0, and load the result of subtraction to register R0. |
| Step 7: | To compare the contents of register R0 with "01" (hexadecimal). |
| Step 8: | To jump to the "ERROR" address if step 7 provides noncoincidence between them. |

As shown in Table-1, a fault can be detected in step 5 on the basis of the noncoincidence result in step 4. One may consider that the fault check can be made by using only steps 7 and 8, not using steps 4 and 5. Actually, there are some faults which can not be found by only the results of steps 7 and 8. It is for this reason that the steps 4 and 5 are essential for this program. As seen from the above, the conventional self-test program needs the check of operation result for each operation execution.

The operation of the microprocessor in the IC under control by the self-test program according to this invention, shown in Table-2, will be described.

| Step 1: | To set "00" (hexadecimal) into the signature register. (As shown in Fig. 3, the NORed value is set and therefore the value "FF" (hexadecimal) is designated in the instruction). |
|---------|--------------------------------------------------------------------|
| Step 2: | To set "01" (hexadecimal) into register R0. |
| Step 3: | To set "FF" (hexadecimal) into register R1. |
| Step 4: | To add together the contents of registers R0 and R1, and load the result of addition to register R0. |
| Step 5: | To subtract the contents of register R1 from those of register R0, and load the result of subtraction to register R0. |
| Step 6: | To compare the contents of the signature register with an expected value "F1" (hexadecimal). |
| Step 7: | To jump to the "ERROR" address if step 6 provides noncoincidence between them. |

In the self-test program of the embodiment, the signature is calculated using the operation result by the ALU in each program step of the machine instruction, and the contents of the signature register is updated (see Table-3). In this program, if an erroneous signature value is once used due to a fault, it consistently appears, in the subsequent signature values. Therefore, a fault can be detected by checking the signature value after a series of operations. This means that the steps to check the operation result for each operation can be omitted, which cannot be omitted in the conventional program. In this respect, the self-test program is simplified. In the program shown in Table-2, a fault can be detected in step 7 by the noncoincidence between the compared items in step 6.

With such an arrangement, the signature value can be used in the self-test program in the application system containing the microprocessor, when power is on. It is easy to prepare the self-test program and to reduce the number of the program steps. Particularly, when the self-test program, together with the main program of the application system, is stored in a ROM, the reduction of program steps is very important.

Figure 4A:
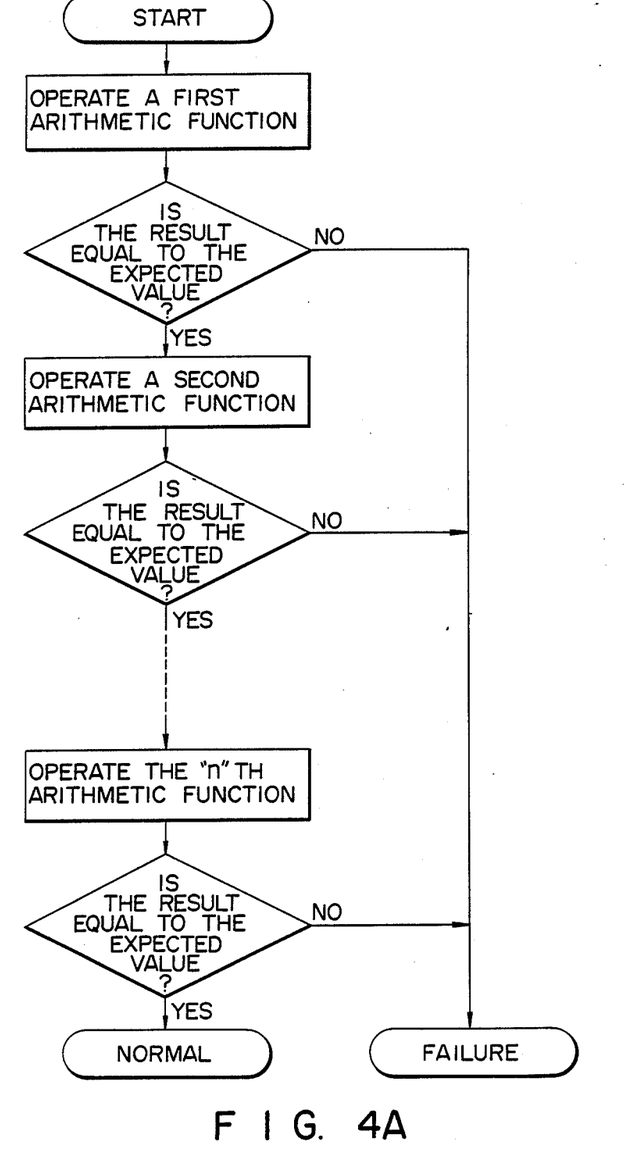
FIGS. 4A and 4B show flowcharts illustrating the process flows of self-test programs, which are respectively used in LSIs of prior art and this invention, respectively.
Figure 4B:
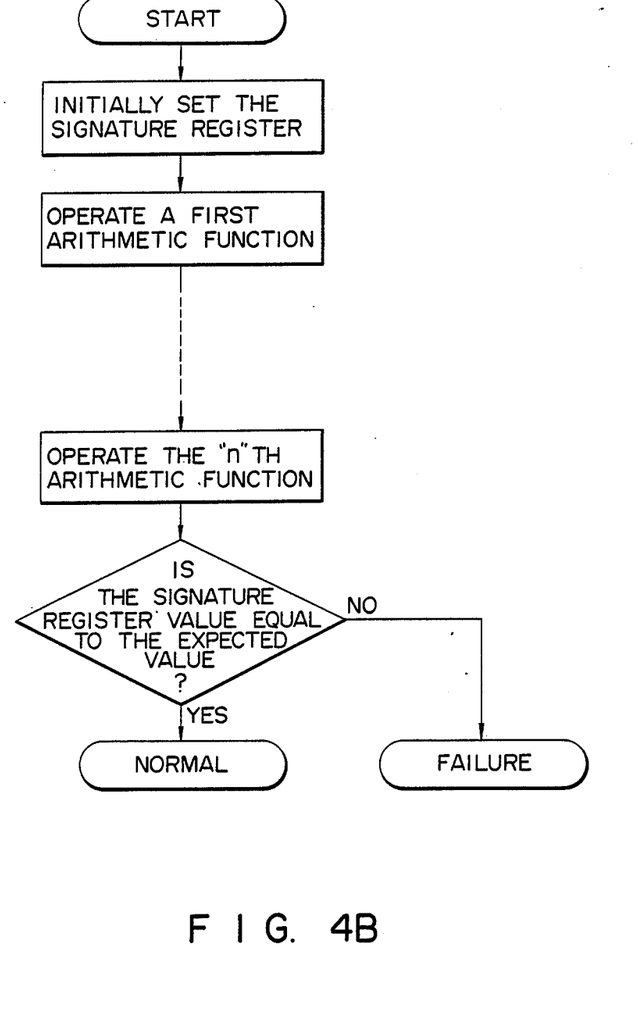

Turning now to FIGS. 4A and 4B, there are shown simple examples of processing flows of the self-test programs. The flowchart of FIG. 4A is for the conventional program, while that of FIG. 4B is for the self-test program according to this invention. In these programs, the "n" operations are executed for fault detection.

In the flow of FIG. 4A, the fault check must be performed every operation result check. In other words, the fault check of "n" times are needed for "n" times operations. In the case of the FIG. 4B program, for the fault check, the signature value is merely checked after the "n" times operations, although the initial setting is needed. This indicates that the number of fault checks is reduced by (n−1). This is more effective for the program with a large number of steps.

The signature value may be used as a pseudo-random number. In this case, since the pseudo-random number can be obtained every instruction, the operation section in the microprocessor according to this invention can be used as a high speed random number generator. For generating random numbers by the normal program, about ten steps of instructions are required.

While in the above-mentioned embodiment, the signature register in the 3-bus system operation section is of the 8-bit type, it should be understood that when the operation section used is of the 2-bus or one-bus system, the bit length of the signature register may be any other than the 8-bit length.

Figure 5:
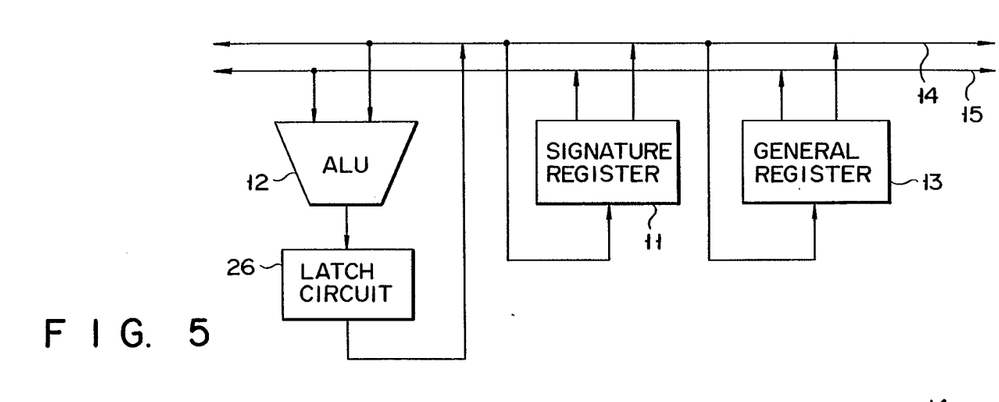
FIGS. 5 to 7 show block diagrams of other embodiments of this invention.
Figure 6:
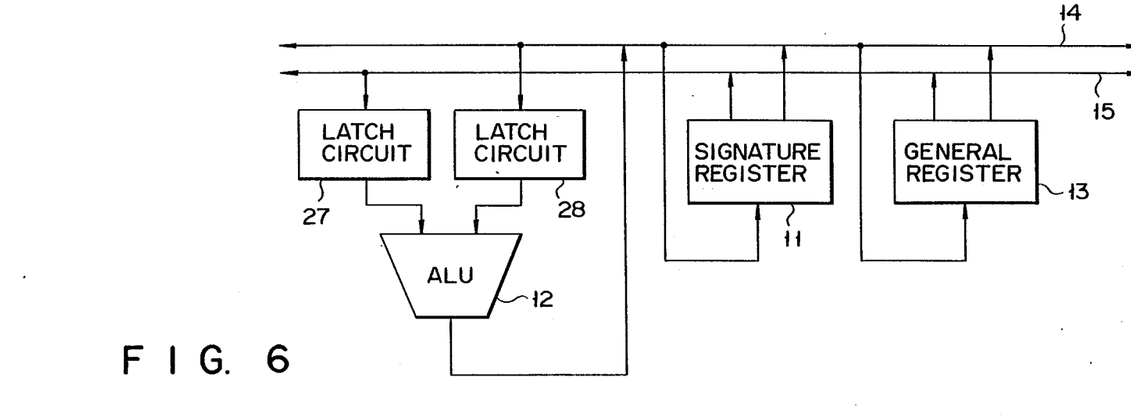
Figure 7:
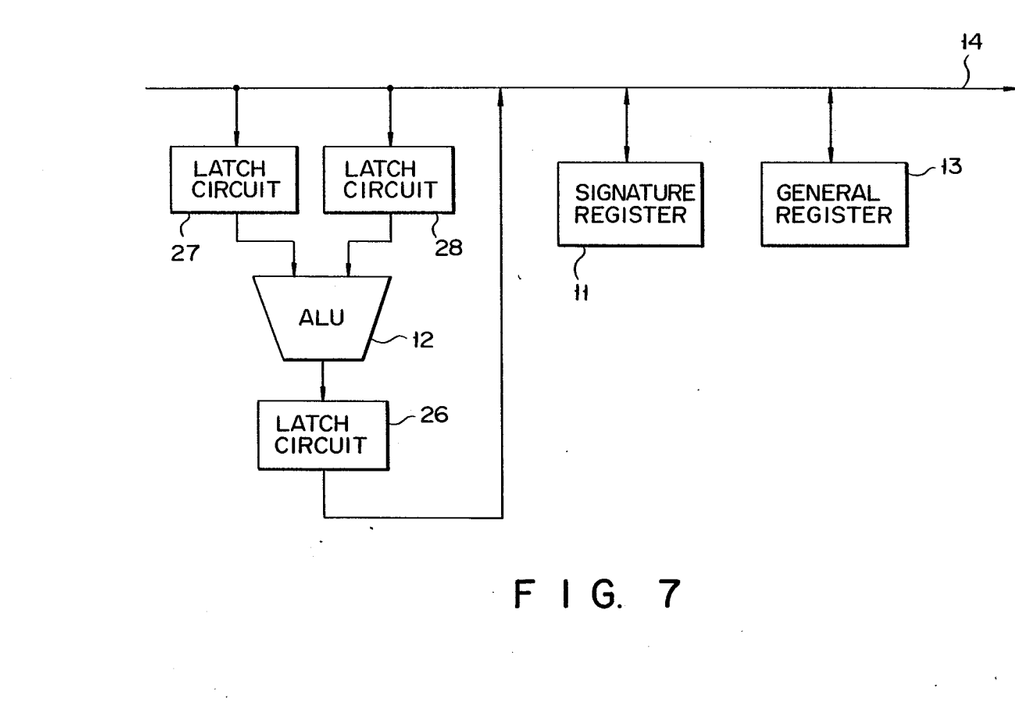

FIGS. 5 and 6 shows the circuit arrangements of operation sections of the 2-bus system, and FIG. 7 a circuit arrangement of an operation section of the one-bit system. In FIG. 5, like reference symbols are used for designating like or equivalent portions in FIG. 1. In this embodiment, the output of operation section (ALU) 12 is latched in latch circuit 26, so that first or second operation input bus 14 or 15 is used in time-divisional manner, and further it is also used as an operation result output bus. More specifically, the values stored in the two registers (not shown) of general register 13 as selected, respectively, are applied through operation input/output bus 14 and operation input bus 15 to operation section 12 where these values are added together. The addition result from operation section 12 is supplied to latch circuit 26 where it is latched. Under control by a system controller (not shown), the addition result from this latch circuit 26 is output to operation input-/output bus 14 when the bus 14 is not busy. The result passes through bus 14 to be loaded into general register 13, and is supplied to signature register 11 which in turn calculates a signature. With such an arrangement, the output bus 16 is not required, and substantially the same effects as those of the FIG. 1 embodiment can be obtained.

Alternatively, the addition result from operation section 14 is not latched. As shown in FIG. 6, the values stored in the selected two registers (not shown) of general register 13 are loaded through buses 14 and 15 to latch circuits 27 and 28. Then, under control of a system controller (not shown), the latched signals are supplied to operation section (ALU) 12 when bus 14 is not busy. In the operation section, these latched values are added together. The addition result from this section is loaded into general register 13 and signature register 11, via bus 14.

FIG. 7 shows an operation section 12 of one-bus system in which latch circuits are connected at the input terminals and the output terminal of the operation section. As shown, two latch circuits 27 and 28 are connected to the input terminals of operation section (ALU) 12, and latch circuit 26 is connected to the output terminal of the same. In operation, at the first timing, the value (the first operand in the operation section 12) stored in the first register of general register 13 as selected, is loaded via bus 14 to latch circuit 27, and latched therein. At the second timing, the value (the second operand in the operation section 12) stored in the second register of general register 13 as selected, is loaded via bus 14 to latch circuit 28, and latched therein. After the operands are latched in these latch circuits 27 and 28, these operands are transferred to operation section 12 at the third timing. The addition result obtained by operation section 12 is transferred to latch circuit 26 and latched therein. At the fourth timing that operation input bus 14 is not busy, latch circuits 26 outputs the addition result to this bus 14, and is stored in general register 13, and at the same time is loaded into signature register 11 to calculate a signature. The arrangement as mentioned above eliminates the need for output bus lines 15 and 16, while attaining substantially the same effects as that of the embodiments as already mentioned.

While an embodiment of this invention have been described, it should be understood that the invention may be variously changed and modified within the scope of the invention. In the above-mentioned embodiment, the signature register and the general register are provided in the same status. If necessary, the signature register may be connected with other registers, for example, a processor status word (PSW), a memory address register and a memory data register, in the same status. In connection with the bits arrangement of the signature register, the instance of FIG. 3 uses the single circuit for both the signature calculation and the value setting, and sets a NORed value in the circuit when a value is set. Alternatively, a selector is provided at the input of the latch circuit, and is used for selecting the signature calculation or the value setting. Further, that circuit is designed so as to accept any value, but if necessary, it may be modified so as to accept a specific value, for example, all "0's" or "1's" alone. As a matter of course, the polynomial for signature calculation may be any polynomial. In the embodiment as mentioned above, the signature is calculated every clock arrival. If microinstructions are used for the machine instructions, the signature calculation may be performed at the timing as specified by the microinstructions.

As described above, according to this invention, the test function can be performed not only for the LSIs, but also for the normal operation. This feature simplifies a self-test program for self-testing an application system and makes it easy to prepare.

What is claimed is:

1. A semiconductor integrated circuit device having a signature register operable in a test mode, comprising:
    test mode means for providing a test mode;
    a signature register coupled to the test mode means;
    means coupled to the signature register for operating the signature register in the test mode;
    means coupled to the signature register for setting a signature in the signature register;
    means coupled to the signature register for generating a machine instruction; and
    means coupled to the signature register for recognizing the machine instruction to access the signature register.

2. A semiconductor integrated circuit device according to claim 1, in which the signature register comprises means for calculating the signature using an output value of an operation section in a microcomputer.

3. A semiconductor integrated circuit device according to claim 2, in which the signature calculating means performs a polynominal of an order which is equal to the number of bits of the output value of the operation section.

4. A semiconductor integrated circuit device according to claim 2, in which the signature calculating means performs the signature calculation in every machine cycle of the microcomputer.

5. A semiconductor integrated circuit device according to claim 2, in which the signature calculating means performs the signature calculation in every machine cycle of the operation section.

6. A semiconductor integrated circuit device according to claim 2, in which the signature calculating means performs the signature calculation in every cycle designated by a microinstruction.

7. A semiconductor integrated circuit device having a signature register operable in test mode, comprising:
    a general register having an input terminal and first and second output terminals;
    first and second operation input buses connected to the first and second output terminals of the general register;
    a operation section having an output terminal and having first and second input terminals connected to the first and second operation input buses, for receiving a value stored in the general register;
    an operation result output bus connected to the output terminal of the operation section and the input terminal of the general register, for supplying an operation result of the operation section of the general register and for storing the operation result of the operation section in the general register;
    a signature register having an input terminal connected to the operation result output bus and first and second output terminals connected to the first and second input buses, and comprising means for calculating a signature value of the operation result provided by the operation section when the operation result is loaded into the general register;
    test mode means for providing a test mode;

means coupled to the signature register for operating the signature register in the test mode;

means coupled to the signature register for setting the signature value in the signature register;

means coupled to the signature register for generating a machine instruction; and means coupled to the signature register for recognizing the machine instruction to access the signature register.

8. A semiconductor integrated circuit device having a signature register operable in a test mode, comprising:

a general register having an input terminal and first and second output terminals;

an operation input/output bus connected to the input terminal and the first output terminal of the general register;

an operation input bus connected to the second output terminal of the general register;

an operation section having an output terminal and having input terminals connected to the operation input/output bus and the operation input bus, for receiving a value stored in the general register;

latch mean provided between the output terminal of the operation section and the operation input/output bus, for latching an operation result of the operation section when the operation input/output bus is received a signal from the general register, and supplying the operation result provided by the operation section to the general register via the operation input/output bus when the inputting of the signal from the general register to the latch means ends;

a signature register having an input terminal and a first output terminal connected to the operation input/output bus, and a second output terminal connected to the operation input bus, the signature register comprising means for calculating a signature value of the operation result provided by the operation section when the operation result is loaded into the general register;

test mode means for providing a test mode;

means coupled to the test mode means for operating the signature register in the test mode;

means coupled to the signature register for setting the signature value in the signature register;

means coupled to the signature register for generating a machine instruction; and means coupled to the signature register for recognizing the machine instruction to access the signature register.

9. A semiconductor integrated circuit device having a signature register operable in a test mode, comprising:

a general register having an input terminal and first and second output terminals;

an operation input/output bus connected to the input terminal and the first output terminal of the general register;

an operation input bus connected to the second output terminal of the general register;

a first latch means having an input terminal connected to the operation input/output bus, for latching one of the output terminals of the general register when the operation input/output bus is receiving a signal from the general register, and outputting a latched value when the inputting of the signal from the general register to the first latch means ends;

a second latch means having an input terminal connected to the operation input bus, for latching one of the output terminals of the general register when the operation input bus is receiving a signal from the general register, and outputting a latched value when the inputting of the signal from the general register to the second latch means ends;

an operation section having first and second input terminals connected to the output terminals of the first and second latch means, respectively, for receiving the output of the first and second latch means, and for outputting an operation result to the operation input/output bus;

a signature register having an input terminal and a first output terminal connected to the operation input/output bus, and a second output terminal connected to the operation input bus, the signature register comprising means for calculating a signature value of the operation result provided by the operation section when the operation result is loaded into the general register;

test mode means for providing a test mode;

means coupled to the test mode means for operating the signature register in the test mode;

means coupled to the signature register for setting the signature value in the signature register;

means coupled to the signature register for generating a machine instruction; and means coupled to the signature register for recognizing the machine instruction to access the signature register.

10. A semiconductor integrated circuit device having a signature register capable in a test mode, comprising:

a general register having an input terminal and first and second output terminal, the general register supplying first and second operands;

an operation input/output bus connected to the input terminal and the first output terminal of the general register;

first latch means having an input terminal connected to the operation input/output bus, for latching the first operand as an output signal when the operation input/output bus is receiving the first operand from the general register;

a second latch means having an input terminal connected to the operation input/output bus, for latching the second operand as an output signal when the operation input/output bus is receiving the second operand from the general register;

an operation section having first and second input terminals connected to the output terminals of the first and second latch means, for receiving the output signals of the first and second latch means;

a third latch means connected between one of the output terminals of the operation section and the operation input/output bus, the third latch means latching an operation result of the operation section when the operation input/output bus is receiving the operands from the general register, and outputting the operation result provided by the operation section as an output signal when the inputting of the operands ends;

a signature register having an input terminal and an output terminal connected to the operation input/output bus, and the signature register comprising means for calculating a signature value of the operation result provided by the operation section when the operation result is loaded into the general register;

test mode means coupled to the signature register for providing a test mode;

means coupled to the signature register for operating the signature register in the test mode;

means coupled to the signature register for setting the signature in the signature register;

means coupled to the signature register for generating a machine instruction; and means coupled to the signature register for recognizing the machine instruction to access the signature register.

* * * * *